(12) United States Patent
Chacko et al.

(10) Patent No.: US 9,190,214 B2
(45) Date of Patent: Nov. 17, 2015

(54) SOLID ELECTROLYTIC CAPACITORS WITH IMPROVED ESR STABILITY

(75) Inventors: Antony P. Chacko, Greer, SC (US); Debra L. Naramore, Simpsonville, SC (US)

(73) Assignee: KEMET ELECTRONICS CORPORATION, Simpsonville, SC (US)

( * ) Notice: Subject to any disclaimer, the term of this patent is extended or adjusted under 35 U.S.C. 154(b) by 571 days.

(21) Appl. No.: 12/512,434

(22) Filed: Jul. 30, 2009

(65) Prior Publication Data

US 2011/0026191 A1    Feb. 3, 2011

(51) Int. Cl.
| H01G 9/04 | (2006.01) |
|---|---|
| H01G 9/145 | (2006.01) |
| H01G 4/228 | (2006.01) |
| H01G 9/02 | (2006.01) |
| H01G 9/10 | (2006.01) |
| H05K 5/03 | (2006.01) |
| H01G 9/004 | (2006.01) |
| H01G 11/28 | (2013.01) |

(52) U.S. Cl.
CPC ............. *H01G 9/004* (2013.01); *H01G 9/04* (2013.01); *H01G 11/28* (2013.01); *Y02E 60/13* (2013.01); *Y10T 29/417* (2015.01); *Y10T 29/43* (2015.01)

(58) Field of Classification Search
CPC ........ H01G 9/0425; H01G 9/012; H01G 9/15
USPC .................................. 361/532, 533, 538, 525
See application file for complete search history.

(56) References Cited

U.S. PATENT DOCUMENTS

| 4,812,951 | A | 3/1989 | Melody et al. ................ 361/504 |
|---|---|---|---|
| 5,185,075 | A | 2/1993 | Rosenberg et al. ........... 205/234 |
| 5,716,511 | A | 2/1998 | Melody et al. ................ 205/324 |
| 6,249,424 | B1 | 6/2001 | Nitoh et al. |
| 6,304,427 | B1 | 10/2001 | Reed et al. ..................... 361/523 |
| 6,324,051 | B1 | 11/2001 | Igaki et al. ..................... 361/523 |
| 6,352,564 | B1 * | 3/2002 | Araki et al. ................... 29/25.03 |
| 6,381,121 | B1 | 4/2002 | Monden et al. ............... 361/525 |
| 6,480,371 | B1 | 11/2002 | Kinard et al. |
| 6,674,635 | B1 | 1/2004 | Eife et al. ...................... 361/523 |
| 6,719,813 | B2 | 4/2004 | Kojima et al. |
| 7,483,259 | B2 | 1/2009 | Biler |

(Continued)

FOREIGN PATENT DOCUMENTS

| GB | 2 168 383 | 12/1985 | |
|---|---|---|---|
| GB | 2448020 A * | 10/2008 | ............... H01G 9/00 |

(Continued)

OTHER PUBLICATIONS

Written Opinion of The International Searching Authority and International Search Report; PCT/US2010/043863, Sang Min Lee, Mar. 29, 2011.

(Continued)

*Primary Examiner* — Eric Thomas
*Assistant Examiner* — Arun Ramaswamy
(74) *Attorney, Agent, or Firm* — Joseph T. Guy; Perkins Law Firm, LLC

(57) ABSTRACT

An improved capacitor, and method for making the capacitor, is described. The capacitor has an anode and a dielectric on the anode. A cathode layer is on the dielectric wherein the cathode layer comprises at least one conductive layer and an insulative adhesion enhancing layer.

24 Claims, 2 Drawing Sheets

(56) References Cited

U.S. PATENT DOCUMENTS

2002/0142214 A1* 10/2002 Pekala et al. .................. 429/144
2005/0013093 A1* 1/2005 Nagasawa et al. ............ 361/508

FOREIGN PATENT DOCUMENTS

JP          08294012         12/2008
WO    WO 2007037044 A1 *   4/2007

OTHER PUBLICATIONS

Written Opinion of The International Searching Authority and International Search Report, PCT/US2010/043863, Mar. 30, 2011, Sang Min Lee.
Extended European Search Report for EP10605097.2 completed Feb. 26, 2013.

* cited by examiner

SOLID ELECTROLYTIC CAPACITORS WITH IMPROVED ESR STABILITY

BACKGROUND

The present invention is related to an improved method of forming a solid electrolyte capacitor and an improved capacitor formed thereby. More specifically, the present invention is related to an improved method of electrically connecting a cathode to a cathode lead in a capacitor and an improved capacitor formed thereby.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as 7,7',8,8'-tetracyanoquinonedimethane (TCNQ) complex salt, or intrinsically conductive polymers, such as polyaniline, polypyrol, polythiophene and their derivatives. The solid cathode electrolyte is applied so that it covers all dielectric surfaces. An important feature of the solid cathode electrolyte is that it can be made more resistive by exposure to high temperatures. This feature allows the capacitor to heal leakage sites by Joule heating. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode layer which typically includes multiple layers designed to allow adhesion on one face to the dielectric and on the other face to the cathode lead. A highly conductive metal lead frame is used as a cathode lead for negative termination. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or spray techniques with other less desirable techniques being reported.

The carbon layer serves as a chemical barrier between the solid electrolyte and the silver layer. Critical properties of the layer include adhesion to the underlying layer, wetting of the underlying layer, uniform coverage, penetration into the underlying layer, bulk conductivity, interfacial resistance, compatibility with the silver layer, buildup, and mechanical properties.

The cathodic conductive layer, which is preferably a silver layer, serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties. Compatibility with the subsequent layers employed in the assembly and encapsulation of the capacitor are also critical. In the case where a silver filled adhesive is used to attach to a lead frame compatibility between the lead frame and the silver filled adhesive is necessary. The silver layer is secured to a cathode lead frame by a conductive adhesive. The conductive adhesive is typically a silver filled resin which is cured after the capacitor is assembled.

Equivalent Series Resistance (ESR) stability of the capacitors requires that the interface between the cathode layer, cathodic conductive layers, conductive adhesive, and leadframe have good mechanical integrity during thermo mechanical stresses. Solid electrolytic capacitors are subject to various thermomechanical stresses during assembly, molding, board mount reflow etc. During board mount the capacitors are subjected to temperatures above 250° C. These elevated temperatures create stresses in the interfaces due to coefficient of thermal expansion (CTE) mismatches between the interfaces. The resultant stress causes mechanical weakening of the interfaces. In some cases this mechanical weakening causes delamination. Any physical separation between the interfaces cause increases in electrical resistance between the interfaces and thus an increased ESR in the finished capacitor.

U.S. Pat. No. 6,304,427 teaches a method for improving ESR stability of capacitors. The combination of materials described therein offers some ESR stability, however, the method still allows an ESR rise of a few milliohms during board mount conditions. An ESR shift of a few milliohms is undesirable for new ultra low ESR capacitors with typical ESR specifications of 5 milliohms. An ESR shift of 1 milliohm in these ultra low ESR capacitors causes a 20% increase in ESR after board mount and this increase can cause unacceptable signal noise increases in capacitors.

JP 2007/124892 describes a non-adhesive resin which reduces stress. The non-adhesive resin is not in the conductive portion of the capacitor.

There is an ongoing desire in the art for a capacitor with an even larger decrease in ESR.

SUMMARY

It is an object of the present invention to provide a solid electrolytic capacitor with improved ESR stability by using an insulative adhesion enhancing layer between the cathodic conductive layer and conductive adhesive layer and preferably between the cathodic conductive layer and the encapsulant.

A particular feature of the capacitor is the improved ESR stability.

It is another object of the present invention to provide a capacitor comprising the improved cathode interface wherein the capacitor has improved properties due to the presence of an insulative adhesion enhancing layer which decreases thermal stresses at the cathodic interfaces.

In a particularly preferred embodiment the insulative adhesion enhancing layer has an onset of degradation temperature below 350° C.

It is another object of the present invention to provide insulative adhesion enhancing layer with improved adhesion.

It is another object of the present invention to provide a capacitor comprising the improved cathode wherein the capacitor has improved properties owing to the improved adhesion between the cathodic conductive layer and conductive adhesive or between the cathodic conductive layer and encapsulant.

It is another object of the present invention to provide an improved method for manufacturing capacitors.

It is another object of the present invention to provide a capacitor with improved conduction between cathodic layers and the lead frame without detriment to the adhesion between these layers.

A particular feature of the present invention is the ability to provide the improvements with minor changes in the manufacturing process and with improved yields.

These and other advantages, as will be realized, are provided in a capacitor with an anode and a dielectric on the anode. A cathode layer is on the dielectric wherein the cathode layer comprises at least one conductive layer and an insulative adhesion enhancing layer.

Yet another embodiment is provided in a method for forming a capacitor comprising:
providing an anode;
forming a dielectric on the anode;
applying a cathode on the dielectric wherein the cathode comprises an insulative adhesion enhancing layer; and
electrically connecting a cathode lead to the cathode.

DETAILED DESCRIPTION

The present invention mitigates the deficiencies of the prior art by providing an insulative adhesion enhancing layer between the cathodic conductive layer and the encapsulant and between the cathodic conductive layer and conductive adhesive. Though contrary to expectations in the art an insulative layer with specific properties is demonstrated herein to improve ESR.

The insulative adhesion enhancing layer increases productivity without detriment to the electrical properties of the capacitor.

The present invention will be described with reference to the various figures which illustrate, without limiting, the invention. Throughout the description similar elements will be numbered accordingly.

Figure 1:
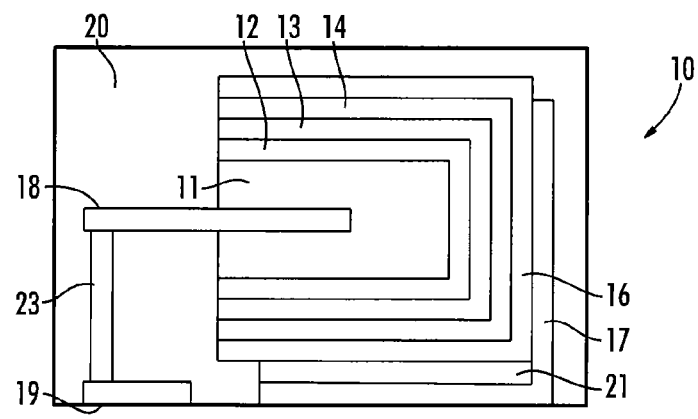
FIG. 1 is a cross-sectional schematic view of a prior art capacitor.

FIG. 1 illustrates a cross-sectional schematic view of a prior art capacitor generally represented at 10. The capacitor comprises an anode, 11, preferably comprising a valve metal as described further herein with an anode lead wire, 18, extending there from. A dielectric layer, 12, is provided on the surface of the anode, 11. Coated on the surface of the dielectric layer, 12, is a solid cathode electrolyte layer, 13. A carbon layer, 14, and cathodic conductive layer, 16, provide electrical conductivity and a surface which is more readily adhered to the cathode terminal, 17, than is the solid cathode electrolyte layer, 13. The layers including the solid cathode electrolyte, 13, conductive adhesive, 21, and layers there between are referred to collectively herein as the cathode layer which typically includes multiple layers designed to allow adhesion on one face to the dielectric and on the other face to the cathode lead, 17. A conductive adhesive layer, 21, secures the cathode conductive layer to the cathode lead or terminal. The anode wire, 18, is electrically connected to the anode terminal, 19, by a connector, 23, which may be integral to a lead frame. The entire element, except for the terminus of the terminals, is then preferably encased in a non-conducting material, 20, or encasement such as an epoxy resin.

The present invention is primarily directed to improved integrity of the cathode interfaces by providing an insulative adhesion enhancing layer between the cathode conductive layer the conductive adhesive.

The insulative adhesion enhancing layer comprises a polymer selected from the group of polymers which has an onset of degradation below 350° C. and which possess improved adhesion properties. In a particularly preferred embodiment the insulative adhesion enhancing layer possesses improved adhesion between conductive layer and encasement.

Figure 2:
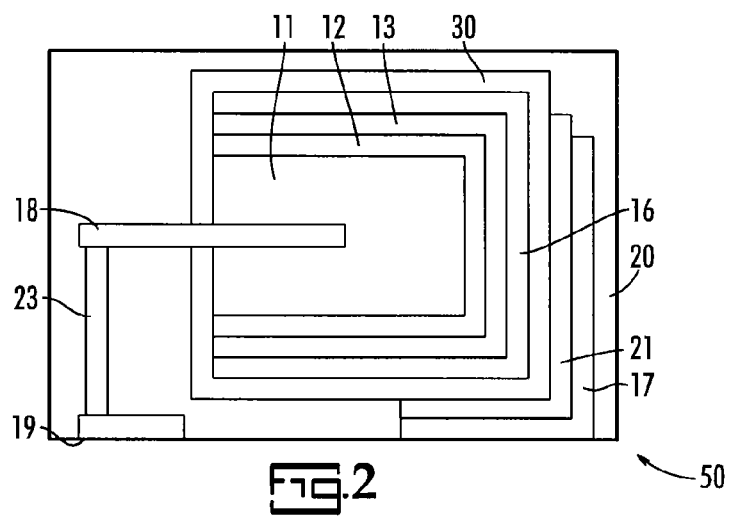
FIG. 2 is a cross-sectional schematic view of an embodiment of the invention.

An embodiment of the present invention is illustrated schematically in FIG. 2 at 50. In FIG. 2 the anode, 11; dielectric, 12; cathode, 13; cathode conducting layer, 16, cathode termination, 17; anode wire, 18; anode termination, 19; non-conducting material, 20; and connector, 23, are as illustrated relative to FIG. 1. An insulative adhesion enhancing layer, 30 is positioned between the cathode conducting layer, 16, and the conductive adhesive layer, 21. It is preferable that the insulative adhesion enhancing layer cover, at least, a portion of the cathode conducting layer. In a preferred embodiment the insulative adhesion enhancing layer is between the cathode conductive layer, 16, and the non-conducting material, 20, forming an encasement. In a particularly preferred embodiment the insulative adhesion enhancing layer incases a substantial portion of the underlying structure including a portion of the anode wire, 18. The insulative adhesion enhancing layer forms a strong bond between the underlying layer and the non-conducting material forming the encasement.

The function of the insulative adhesion enhancing layer is to decrease thermal stress between encapsulation and cathode layer, while enabling electrical conduction between conductive layer, conductive adhesive and leadframe.

Though not limited to any theory, it is believed that the insulative adhesion enhancing layer provides protection by mitigating any effect of thermal expansion differences between the layers above and below the insulative adhesion enhancing layer. By mitigating the thermal expansion differences the bond between the layers is maintained thereby increasing the conductivity through the ultimate layer. It is contrary to the expectations of a skilled artisan to consider an insulating layer anywhere within the structure between the anode, or cathode, and terminations. It if further contrary to the expectations of a skilled artisan that the ESR actually decreases with incorporation of an insulating layer between the cathode and cathode lead.

The insulative adhesion enhancing layer should possess significant softening properties at conductive adhesive cure temperatures (200° C.-300° C.). If the insulative adhesion enhancing layer does not show sufficient softening at adhesive cure temperature, this layer will decrease electrical conduction between the cathodic conductive layer and conductive adhesive layer. The insulative adhesion enhancing layer is preferably no more than 5 microns thick. Above a thickness of about 5 microns, the insulation will increase the electrical resistance between the cathodic conductive layer and conductive adhesive thus increasing ESR. Another important function of the insulation layer is that it should have excellent adhesion with the cathodic conductive layer as well as encapsulation layer.

A particularly preferred insulative adhesion enhancing layer comprises a material selected from the group of thermoplastic polymer selected from polyalkylene carbonate (PAC) and especially polyethylene carbonate, polypropylene carbonate and polybutylene carbonate; polyvinyl acetate and its copolymers, acrylic and its copolymers, vinyl acetate acrylic copolymers, polyurethane and its copolymers, urethane acrylic copolymers, urethane vinyl acetate copolymers, polyamide, and blends of these polymers.

The cathode layer is a conductive layer preferably comprising conductive polymer, such as polythiophene, polyaniline, polypyrrole or their derivatives; manganese dioxide, lead oxide or combinations thereof. An intrinsically conducting polymer is most preferred.

A particularly preferred conducting polymer is illustrated in Formula I:

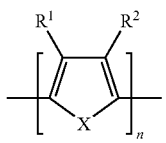

FORMULA 1

$R^1$ and $R^2$ of Formula 1 are chosen to prohibit polymerization at the β-site of the ring. It is most preferred that only a-site polymerization be allowed to proceed. Therefore, it is preferred that $R^1$ and $R^2$ are not hydrogen. More preferably, $R^1$ and $R^2$ are a-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$alkylbenzyl, $C_1$-$C_4$ alkoxybenzyl or halobenzyl, 5-, 6-, or 7- membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

The carbon layer comprises a conductive composition comprising resin and conductive carbon particles. The carbon layer may further comprise adjuvants such as crosslinking additives, surfactants and dispersing agents. The resin, conductive carbon particles and adjuvants are preferably dispersed in an organic solvent or water to form a coating solution. The solvent and resin for the conductive carbon layer needs to have good wettability to semi-conductive cathode surface.

The cathode conductive layer preferably comprises a conductive composition comprising resin and conductive silver particles. The silver layer may further comprise adjuvants such as crosslinking additives, surfactants and dispersing agents. The resin, conductive silver particles and adjuvants are preferably dispersed in an organic solvent or water to form a coating solution. The solvent and resin for the conductive carbon layer needs to have good wettability to carbon surface.

Conductive adhesive is typically used to adhesively attach the metal layer to the lead frame which acts as the cathode lead or to a circuit trace. Conductive adhesive cure conditions are appropriately modified to get electrical conduction through the insulative adhesion enhancing layer. Typical adhesive cure temperature ranges from 150° C. to 300° C. The cure temperature is properly selected depending on the thermal properties of the insulative adhesion enhancing layer. For insulative adhesion enhancing layer comprises of polypropylene carbonate and polyvinyl acetate copolymers, a temperature range of 230° C. to 280° C. need to be used to get good initial ESR and ESR stability A preferred process for forming the capacitor is illustrated in FIG. 3.

Figure 3:
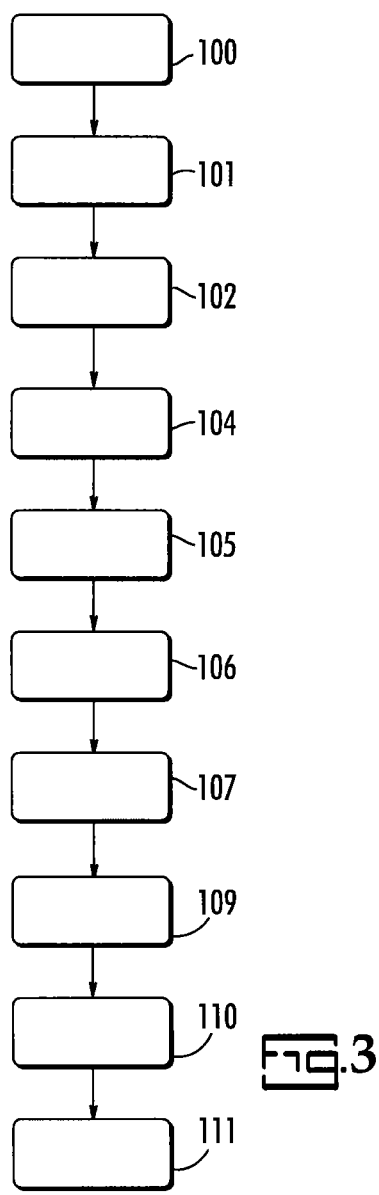
FIG. 3 is a partial cross-sectional schematic view of a preferred transition layer of the present invention.

In FIG. 3, the anode is formed, 100, from a valve metal as described further herein.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. Cathode can be either conducting polymer or $MnO_2$. Conductive polymeric materials may be employed as an anode material. Particularly preferred conductive polymers include polypyrrole, polyaniline and polythiophene. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The anode is preferably etched to increase the surface area particularly if the anode is a valve metal foil such as aluminum foil. Etching is preferably done by immersing the anode into at least one etching bath. Various etching baths are taught in the art and the method used for etching the anode is not limited herein.

The anode wire is preferably attached to the anode, particularly when a compact is employed. The anode wire can be attached by welding or by embedding into the powder prior to pressing. A valve metal is a particularly suitable anode wire and in a preferred embodiment the anode and anode wire are the same material.

A dielectric is formed, 101, on the surface of the anode. The dielectric is a non-conductive layer which is not particularly limited herein. The dielectric may be a metal oxide or a ceramic material. A particularly preferred dielectric is the oxide of a metal anode due to the simplicity of formation and ease of use. The dielectric layer is preferably an oxide of the valve metal as further described herein. It is most desirable that the dielectric layer be an oxide of the anode. The dielectric is preferably formed by dipping the anode into an electrolyte solution and applying a positive voltage to the anode. Electrolytes for the oxide formation are not particularly limiting herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate are also known. Other materials may be incorporated into the dielectric such as phosphates, citrates, etc. to impart thermal stability or chemical or hydration resistance to the dielectric layer.

A conductive layer is formed, 102, on the surface of the dielectric. The conductive layer acts as the cathode of the capacitor. The cathode is a conductor preferably comprising at least one of manganese dioxide and a conductive polymeric material. Particularly preferred conductive polymers include polypyrrole, polyaniline and polythiophene. Metals can be employed as a cathode material with valve metals being less preferred.

After conductive cathode layer formation, 102, a carbon layer is applied, 104, by spraying or dipping. A cathodic conductive layer is applied, 105, over the carbon layer. An insulative adhesion enhancing layer is applied, 106, by spraying or dipping.

A conductive adhesive is added, 107, and the metal layer is adhered to a cathode lead, 109. The capacitor is finished, 110, which may include incorporating anode and cathode terminals, external insulation, testing, packing and the like as known in the art.

The capacitor is illustrated herein as a discrete capacitor for convenience and this is a preferred embodiment. In another preferred embodiment the anode wire and metal layer, of the transition layer, may be in direct electrical contact with a circuit trace wherein elements of the circuit may constitute the cathode lead, anode lead or both. In another preferred embodiment the capacitor may be embedded in a substrate or incorporated into an electrical component with additional functionality.

EXAMPLES

A series of ultra low ESR tantalum anodes using two different sets of anodes designated Anode A and Anode B were prepared. Anode A was a 520V3372R5 E005-5 mohm capacitor. Anode B was a 528Z3372R5E005-5 mohm face down capacitor. The tantalum was anodized to form a dielectric on the tantalum anode in identical fashion. In each sample a conducting polyethylenedioxythiophene cathode was formed on the dielectric with a carbon layer and a silver layer with all samples prepared in identical fashion. The capacitors with conductive polymeric cathodes were split into three groups. In a control group a conductive adhesive was applied directly on the silver layer. In one inventive group a polypropylene carbonate (PPC) insulative coating was first applied on the silver layer at a thickness of less than 2 microns followed by conductive adhesive. In a second inventive group, a vinyl acetate copolymer (VAC) coating solution was applied on the silver layer at a thickness of less than 2 microns followed by conductive adhesive. The control and both inventive samples were assembled onto a leadframe and encapsulated using mold epoxy. The capacitors thus formed were mounted on a board. The mounted capacitors were further exposed to second and third board mounting conditions to simulate the customer applications. The ESR before and after each mounting was measured and reported in Table 1.

TABLE 1

| Sample | Anode | Insulator | Mountings | Initial ESR | % ESR shift |
|---|---|---|---|---|---|
| C-1 | A | — | 0 | 4.3 | — |
| C-2 | A | — | 1 | 5.4 | 26 |
| C-3 | A | — | 2 | 6.1 | 44 |
| I-1 | A | PPC | 0 | 4.3 | — |
| I-2 | A | PPC | 1 | 4.8 | 12 |
| I-3 | A | PPC | 2 | 4.9 | 14 |
| I-4 | A | VAC | 0 | 4.3 | — |
| I-5 | A | VAC | 1 | 4.7 | 9 |
| I-6 | A | VAC | 2 | 4.8 | 11 |
| C-4 | B | — | 0 | 3.9 | — |
| C-5 | B | — | 1 | 6.0 | 54 |
| C-6 | B | — | 2 | 6.4 | 65 |
| I-7 | B | PPC | 0 | 3.9 | — |
| I-8 | B | PPC | 1 | 4.5 | 12 |
| I-9 | B | PPC | 2 | 4.8 | 14 |
| I-10 | B | VAC | 0 | 3.9 | — |
| I-11 | B | VAC | 1 | 3.9 | — |
| I-12 | B | VAC | 2 | 4.0 | 2 |

The results clearly indicate the advantages offered by the present invention. In particular, an insulative adhesion enhancing layer provides a significant advantage as represented by a decrease in ESR resulting from the mounting process.

The invention has been described with particular emphasis on the preferred embodiments. One of skill in the art would realize additional embodiments, alterations, and advances which, though not enumerated, are within the invention as set forth more specifically in the claims appended hereto.

The invention claimed is:
1. A capacitor comprising:
an anode;
a dielectric on said anode;
a cathode layer on said dielectric wherein said cathode layer comprises at least one conductive layer and an insulative adhesion enhancing layer forming an encasement between said conductive layer and a conductive adhesive layer wherein said adhesion enhancing layer comprises a polymer with a glass transition temperature wherein said insulative adhesion enhancing layer has a coating thickness of no more than 5 microns; and
the conductive adhesive adhering a cathode lead to said cathode layer wherein said conductive adhesive has a cure temperature above said glass transition temperature.

2. The capacitor of claim 1 wherein said insulative adhesive enhancing layer is between said cathode
lead and said conductive layer.

3. The capacitor of claim 1 wherein said cathode layer is electrically connected to said cathode lead through said insulative adhesion enhancing layer.

4. The capacitor of claim 1 further comprising an encapsulating case.

5. The capacitor of claim 4 wherein a portion of said insulative adhesion enhancing layer is between said conductive layer and said encapsulating case.

6. A capacitor comprising:
an anode;
a dielectric on said anode;
a cathode layer on said dielectric wherein said cathode layer comprises at least one conductive layer and an insulative adhesion enhancing layer between said conductive layer and a conductive adhesive layer wherein said insulative adhesion enhancing layer comprises a polymer with an onset of degradation temperature below 350° C. and a glass transition temperature wherein said insulative adhesion enhancing layer has a coating thickness of no more than 5 microns; and
the conductive adhesive adhering a cathode lead to said cathode layer wherein said conductive adhesive has a cure temperature above said glass transition temperature.

7. The capacitor of claim 1 wherein said conductive layer comprises silver.

8. The capacitor of claim 1 wherein said insulative adhesion enhancing layer covers a portion of said conductive layer.

9. The capacitor of claim 1 wherein said insulative adhesion enhancing layer covers a portion of said cathode layer.

10. The capacitor of claim 1 wherein said insulative adhesion enhancing layer comprises a polymer with a glass transition temperature below 200° C.

11. The capacitor of claim 1 wherein said insulative adhesion enhancing layer comprises a polymer selected from the group consisting of a thermoplastic polymer and a thermoplastic elastomer.

12. The capacitor of claim 1 wherein said insulative adhesion enhancing layer comprises a polymer comprising at least one monomer selected from a group consisting of propylene carbonate, vinyl acetate and acrylic.

13. The capacitor of claim 12 wherein said polymer comprises a copolymer selected from the group consisting of copolymers of vinyl acetate and acrylic, and copolymer of propylene carbonate and vinyl acetate.

14. A capacitor comprising:
an anode;
a dielectric on said anode;
a cathode layer on said dielectric wherein said cathode layer comprises at least one conductive layer and an insulative adhesion enhancing layer between said conductive layer and a conductive adhesive layer wherein said insulative adhesion enhancing layer comprises polyalkylene carbonate wherein said insulative adhesion enhancing layer has a coating thickness of no more than 5 microns; and
a cathode lead in electrical contact with said cathode by the conductive adhesive wherein said conductive adhesive has a cure temperature above a glass transition temperature of said polyalkylene carbonate.

15. The capacitor of claim 14 wherein said polyalkylene carbonate is selected from polyethylene carbonate, polypropylene carbonate and polybutylene carbonate.

16. The capacitor of claim 1 wherein said insulative adhesion enhancing layer comprises vinyl acetate-acrylic copolymer.

17. The capacitor of claim 1 wherein said insulative adhesion enhancing layer encases said cathode layer.

18. The capacitor of claim 1 wherein said insulative adhesion enhancing layer encases at least a portion of said dielectric.

19. The capacitor of claim 1 wherein said insulative adhesion enhancing layer encases a portion of an anode lead wire.

20. A capacitor comprising:
an anode;
a dielectric on said anode;
a cathode layer on said dielectric wherein said cathode layer comprises at least one conductive layer;
a conductive adhesive layer comprising a polymer with a cure temperature of 150-300° C.; and
an insulative adhesion enhancing layer between said conductive layer and said conductive adhesive layer wherein said insulative adhesion enhancing layer comprises a polymer with a glass transition temperature below 200° C. and an onset of degradation temperature below 350° C. and wherein said insulative adhesion enhancing layer has a coating thickness of no more than 5 microns; and
the conductive adhesive adhering a cathode lead to said cathode layer wherein said conductive adhesive has a cure temperature of at least 200° C. to no more than 350° C.

21. The capacitor of claim 20 wherein said insulative adhesion enhancing layer comprises polyalkylene carbonate.

22. The capacitor of claim 21 wherein said polyalkylene carbonate is selected from polyethylene carbonate, polypropylene carbonate and polybutylene carbonate.

23. The capacitor of claim 20 wherein said insulative adhesion enhancing layer comprises vinyl acetate-acrylic copolymer.

24. The capacitor of claim 10 wherein said insulative adhesion enhancing layer comprises a polymer with a glass transition temperature below 50° C.

* * * * *